Dec. 6, 1949  B. WILLIAMS  2,490,724
MUCKING AND LOADING MACHINE
Filed March 6, 1948  3 Sheets-Sheet 1

INVENTOR.
Bernard Williams
BY
Martin E. Anderson
ATTORNEY

Patented Dec. 6, 1949

2,490,724

UNITED STATES PATENT OFFICE 2,490,724

MUCKING AND LOADING MACHINE

Bernard Williams, Mountain Home, Ark.

Application March 6, 1948, Serial No. 13,427

2 Claims. (Cl. 214—140)

This invention relates to improvements in mucking and loading machines of the general type described and claimed in United States Letters Patent No. 2,323,434, granted July 6, 1943.

It is the object of this invention to produce a machine of the type indicated above, that shall be of a very simple and substantial construction and which can be built on a commercial tractor of the type known in the trade as "D-8."

Another object of this invention is to produce a simplified construction that shall be operated in part by means of cables and in part by means of hydraulic mechanism.

A still further object of the invention is to produce a machine of the class specified in which the operation of the machine will be simplified in such a way that the operator thereof may have a fuller and more complete control of the mucking and loading shovel and the hoisting apparatus connected therewith.

A still further object of the invention is to produce a mucking and loading machine in which the mucking and loading shovel is tiltable about a horizontal axis and in which the tilting mechanism comprises two hydraulic cylinders pivotally connected with the lifting arms and controlled by a suitable valve mechanism located within convenient reach of the operator.

The above and other objects of the invention that may become apparent as the description proceeds are attained by means of a construction and an arrangement of parts that will now be described in detail and for this purpose reference will be had to the accompanying drawings in which the invention has been illustrated in its preferred form and in which.

Figure 1:
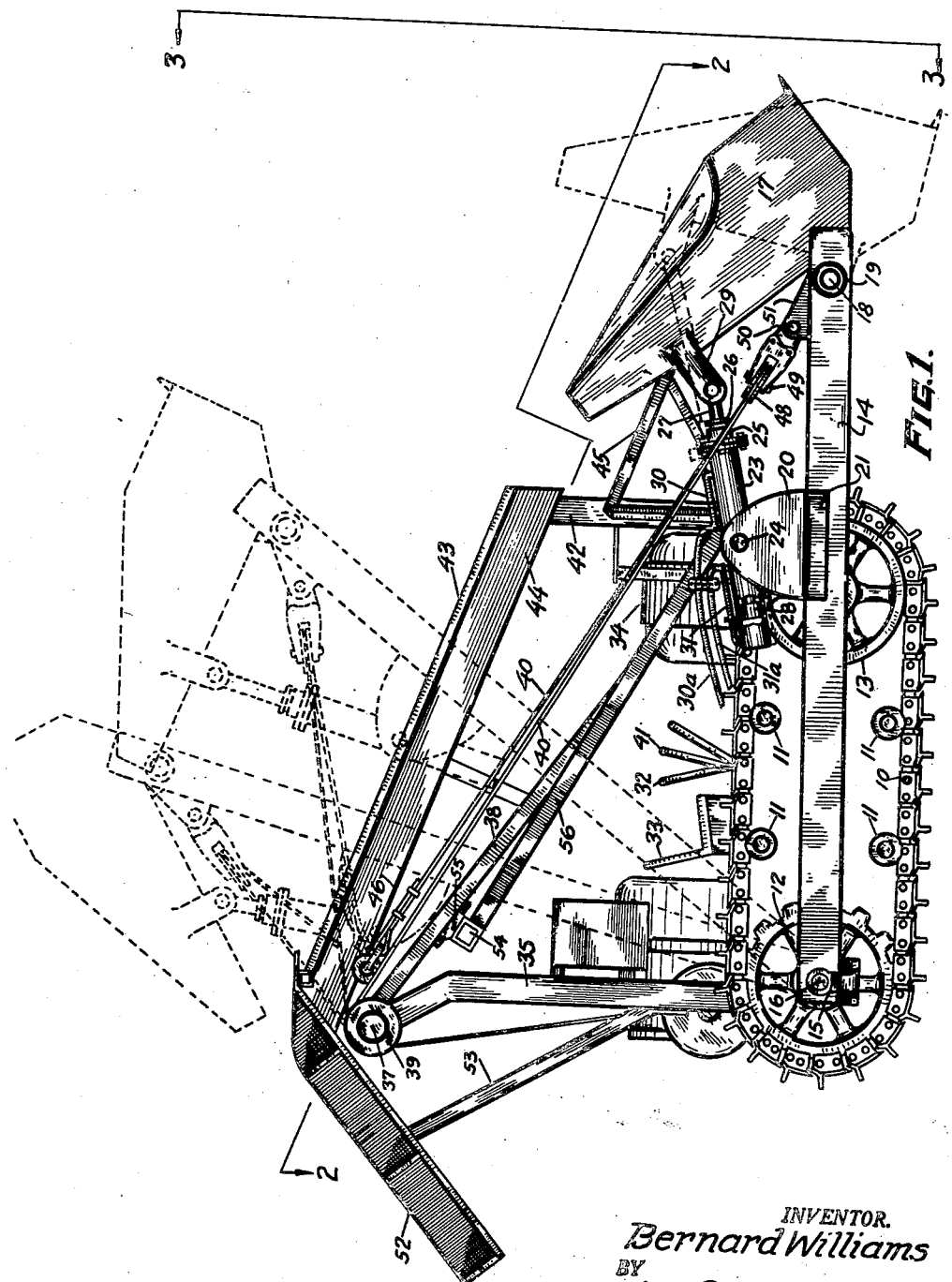
Figure 1 is a side elevation of the machine showing the parts in an intermediate position by means of full lines and in other successive positions by means of broken lines.
Figure 2:
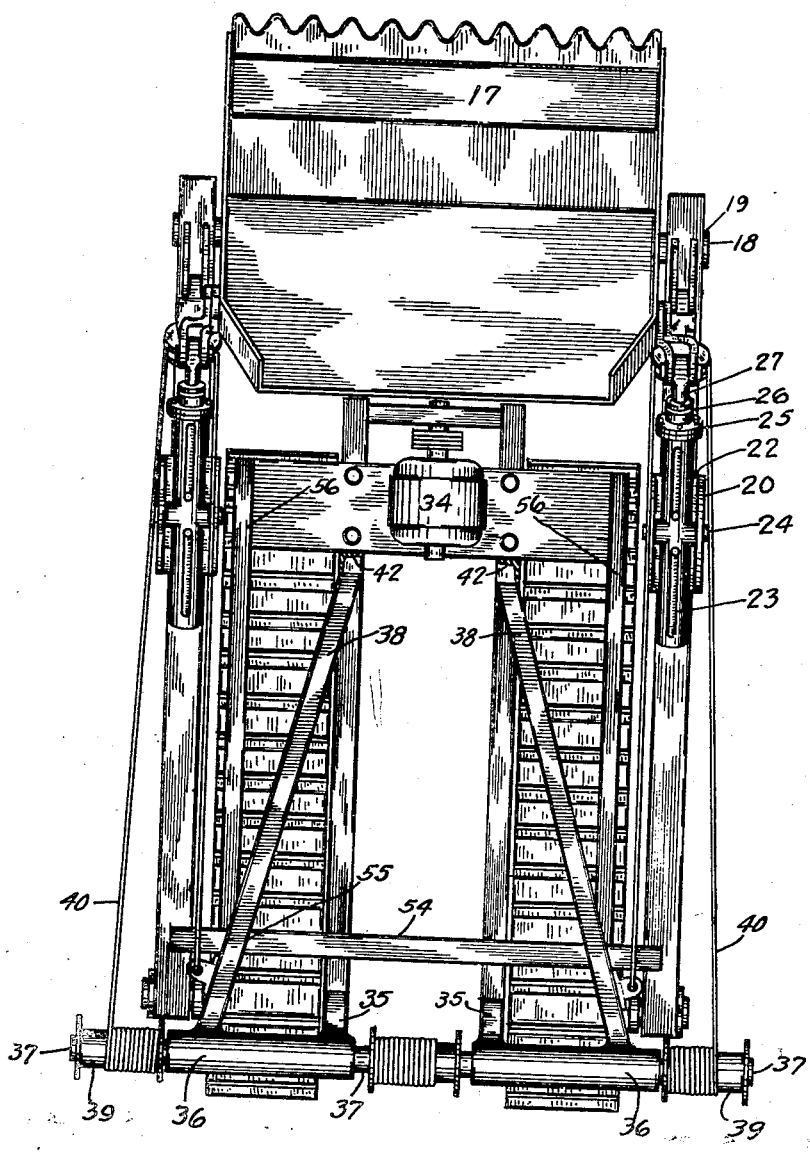
Figure 2 is a section taken on line 2—2, Figure 1.
Figure 3:
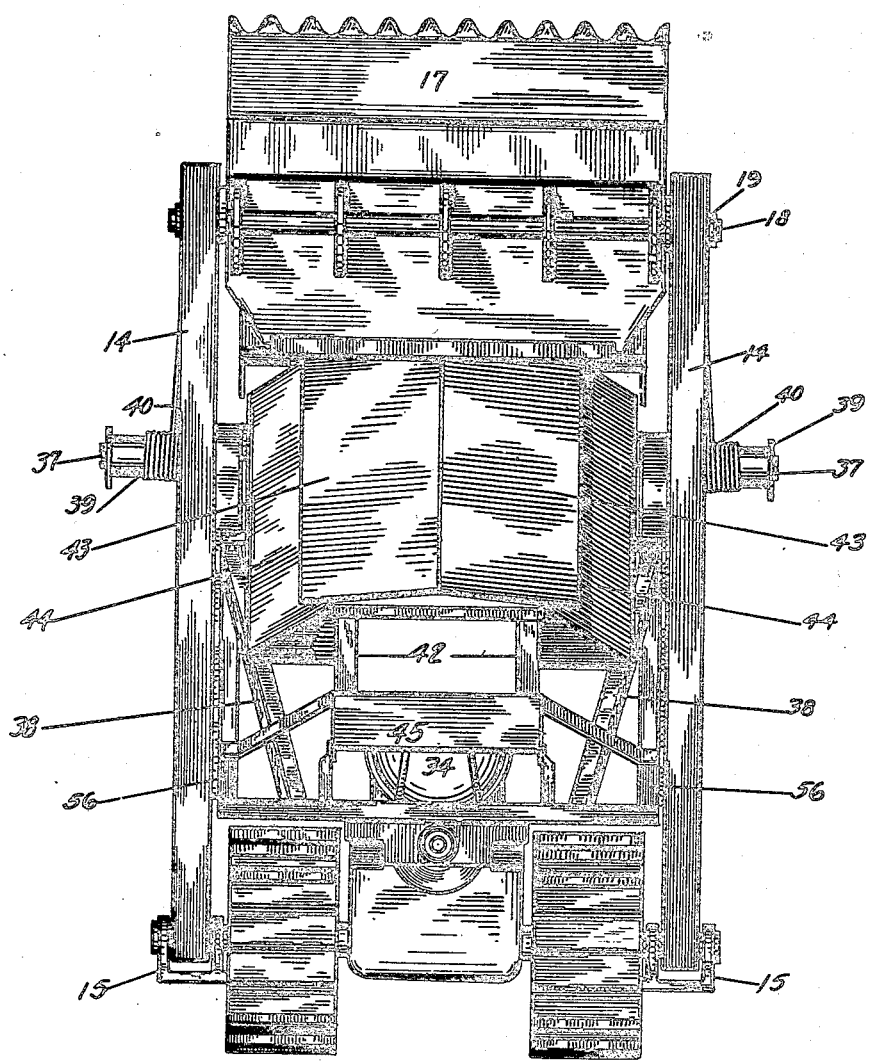
Figure 3 is a front elevation showing the mucking shovel in an elevated position, taken on line 3—3, Figure 1.

In the drawing reference numeral 10 designates the tread of a tractor of the caterpillar type. The frame of the tractor has not been shown in detail, but only such parts thereof as are believed to be necessary to properly disclose the invention which relates to a machine built onto a standard tractor in common use. Reference numerals 11 designate rollers carried by the frame for supporting the endless tread that encircles the wheels designated by reference numerals 12 and 13. Pivotally secured to the tractor at a point substantially concentric with wheels 12 are two shovel lifting arms 14. In the drawing the rear ends of these arms have been shown as connected to suitable brackets 15 by means of pivots 16. There is one arm on each side of the machine but as they are both alike, they will be designated by the same reference numeral. Mucking and loading shovel 17 is positioned between the front ends of arms 14 and mounted for pivotation about shaft 18, whose ends are positioned in bearings 19 of the lifting arms. It will be observed that the shovel 17, as shown in Figures 1 and 2, has a digging wall at its bottom and a material retaining wall at its rear, the latter being substantially perpendicular to the former. In Figure 1 it will be noted that the digging wall may be moved between a forwardly and downwardly inclined position, as shown by dotted lines, to a forwardly and upwardly inclined position, as shown by full lines. Each lifting arm is provided with a pair of upwardly extending brackets 20 that are welded or otherwise secured to the lifting arms and are preferably reenforced by means of angle irons 21 that are welded to the lifting arms and to the bottom connecting plate 22 of the brackets 20. Hydraulic cylinders 23 are positionesd between the upwardly extending bracket plates 20 for rocking movement about pivots 24. Each cylinder is provided with a removable cylinder head 25 that has a stuffing box 26 through which the piston rod 27 extends. The piston rod is provided at its inner end with a piston 28. The outer end of the piston rod is pivotally connected to the brackets 29 of the shovel. Pipes 30 and 31 connect with the interior of each cylinder in a manner shown in Figure 1 and these pipes are connected by flexible tubings 30a and 31a to a valve mechanism controlled by a handle 32 that is located adjacent the operator's seat 33. The tractor is provided with a high pressure oil pump that is operated by the tractor engine. In the present embodiment the engine that is normally furnished with the tractor has been replaced by means of an electric motor 34 which performs all of the functions of the ordinary internal combustion engine. The reason for employing an electric motor is that the particular machine illustrated is being used in a tunnel where the exhaust gases from an internal combustion engine would be objectionable. Reference numeral 34 therefore designates a motor of any suitable type.

Extending upwardly from the rear end of the tractor is a frame comprising two members 35, one member being on each side of the tractor, the upper end of each member 35 being connected with a bearing 36 in which shaft 37 is journaled. Diagonal braces 38 connect bearings 36 with the tractor frame. Winch shaft 37 is mounted for rotation in bearings 36 and this shaft is provided at each end with a drum 39 onto which the hoisting cables 40 are wound. In the drawings the means for rotating shaft 37 has not been illustrated, but it is driven by suitable mechanism from the power take-off of the tractor and is controlled by means of a lever 41 positioned adjacent the operator's seat. The braces 38 connect bearings 36 to the forward end of the tractor frame, as above explained, and serve to give rigidity and strength to the structure. Near the front end of the tractor two angle iron frame members 42 extend upwardly and form a support for the roof that comprises a steel plate 43 and outwardly flaring deflector plates 44. The primary function of the roof is to shield the machinery and the operator from injury or annoyance due to material that sometimes falls from the shovel during operation. Another roof plate 45 extends forwardly beyond the upper roof and serves as a protecting means for the motor 34 in the manner mentioned. A steel cable 46 has one end anchored to a stationary ring 48 and passes around the pulley 48 that is mounted in block 49 that is pivoted at 50 to bracket 51 carried by the lifting arms. The other end of cable 46 is connected with the winch drum 39 which, in turn, is controlled by lever 41 as to direction of movement. It is now apparent that when drums 39 are rotated in a direction to wind the cable thereon, the lifting arms, together with the mucking and loading shovel, will be raised until they reach the rearmost and uppermost position shown by broken lines in Figure 1. The tilting of the shovel is controlled by means of the hydraulic mechanism in the manner heretofore mentioned.

A loading chute 52 is positioned at the rear of the tractor and supported in a suitable manner from the upper ends of frame members 35 and in addition it is supported by diagonal frame members 53. When the loading shovel reaches its uppermost position and is tilted downwardly as shown in Figure 1, the contents thereof will be free to slide onto the upper surface of the loading chute and from thence onto the body of a truck by means of which the material thus discharged my be transported to whatever position desired.

For the purpose of limiting the rearward movement of the lifting arms when the shovel is in discharging position, a stop has been provided. The stop consists of a hollow beam 54 that is supported from bars 35 by some suitable means such as that designated by reference numeral 55 in Figure 1, or it may be welded to brace member 38. Tension members 56 connect stop 54 to the front end of the tractor frame. The ends of beam 54 project into the path of the lifting arms and limit their rearward movement.

After the loading shovel has been emptied, the winch drums are rotated in a reverse direction allowing the shovel lifting arms and the shovel to descend until the lowermost position is reached. Before the shovel is projected into the muck pile, it is turned to the lowermost dotted line position shown in Figure 1. The tractor is then moved towards the muck pile after which the shovel is rocked in a counterclockwise direction putting it into the position shown by full lines. During this rocking operation the shovel cuts into the muck and by its upward movement and rearward tilting, loads the shovel. If the shovel is not sufficiently loaded in one operation, the operation may be repeated. After each loading of the shovel, it is moved upwardly as explained above and discharged into the loading chute.

Particular attention is called to the hydraulic mechanism employed in connection with the control of the loading and mucking above. This mechanism is very simple and positive in its operation and can be readily controlled by means of suitable valve control levers. Since the tractor is provided with a high pressure pump for delivering oil under heavy pressure, the cylinders may be of moderate size.

Since tractors are usually provided with high pressure pumps and with valves that direct the flow of oil to opposite ends of cylinders, the specific valve mechanism has not been illustrated in detail, handle 41 and pipes 30a and 31a being considered sufficient to represent such control means.

Having described the invention, what is claimed as new is:

1. In a mucking and loading machine of the class wherein a tractor forms the base to which two shovel lifting arms are pivoted at their rear ends, a mucking shovel positioned between the front ends connected to the lifting arms for rocking movement about an axis connecting the arms, said mucking shovel having a digging wall and a material retaining wall disposed substantially perpendicular thereto, means including cables operated by the tractor motor for raising and lowering the free ends of the lifting arms, hydraulic means for rocking the shovel about its pivotal connection, said hydraulic means comprising a pair of spaced brackets secured to and projecting upwardly from each lifting arm, a cylinder positioned between the brackets of each pair, each cylinder having oppositely projecting trunnions intermediate its ends mounted for pivotation in the brackets, a piston in each cylinder, a piston rod connected at its inner end with the piston and pivotally connected at its outer end with said shovel at a point spaced radially from its pivot, the longitudinal axis of each cylinder and piston rod being at not to exceed a relatively small angle to the longitudinal axis of its corresponding supporting arm in all positions of the shovel in its rocking movement about its pivotal axis, each cylinder and piston being related to the shovel in such manner that the shovel, when the arms are substantially horizontal, may be disposed between a forwardly and downwardly inclined position, and another position in which the digging wall is inclined forwardly and upwardly, a source of liquid under pressure, and means for controlling the flow of liquid from and to the cylinders.

2. A mucking and loading machine of the type built on a tractor of the caterpillar type, comprising two laterally spaced frame members projecting upwardly from the tractor body near its rear end, a similar pair of frame members extending upwardly from the tractor body near its front end, the last named frame members being shorter than the former, a forwardly and downwardly ranging roof supported on the two pairs of frame members, a pair of lifting arms, one on each side of the tractor frame, the rear ends of said arms being pivoted to the tractor near its rear end, a mucking and loading shovel positioned between the front ends of said arms, means for turning the arms about their pivotal connection with the tractor to a substantially vertical position, and hydraulic means for rocking the shovel on its pivot, said roof serving to protect parts positioned underneath from injury by particles accidentally dropping from the shovel.

BERNARD WILLIAMS.

REFERENCES CITED

The following references are of record in the file of this patent:

UNITED STATES PATENTS

| Number | Name | Date |
|---|---|---|
| 2,323,434 | William | July 6, 1943 |
| 2,427,968 | Hoover | Sept. 23, 1947 |
| 2,438,660 | Garner | Mar. 30, 1948 |
| 2,446,938 | Losch | Aug. 10, 1948 |
| 2,461,653 | Nadherny | Feb. 15, 1949 |